(12) United States Patent
Hirai et al.

(10) Patent No.: US 7,055,552 B2
(45) Date of Patent: Jun. 6, 2006

(54) RUBBER HOSE MATERIAL AND RUBBER HOSE USING THE SAME

(75) Inventors: Ryo Hirai, Komaki (JP); Ayumu Ikemoto, Komaki (JP); Hidehito Ikeda, Kasugai (JP); Yoshio Okado, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/952,922

(22) Filed: Sep. 30, 2004

(65) Prior Publication Data

US 2005/0067036 A1 Mar. 31, 2005

(30) Foreign Application Priority Data

Sep. 30, 2003 (JP) .............................. 2003-340662

(51) Int. Cl.
 *F16L 11/00* (2006.01)
(52) U.S. Cl. ...................... 138/137; 138/141; 138/153; 428/36.91
(58) Field of Classification Search ................ 138/137, 138/153, 141; 428/36.91
 See application file for complete search history.

(56) References Cited

U.S. PATENT DOCUMENTS

| 4,458,103 | A | | 7/1984 | Irie et al. ........................ 174/73 |
| 4,722,959 | A | * | 2/1988 | Inoue et al. ................. 524/412 |
| 5,362,530 | A | * | 11/1994 | Kitami et al. .............. 428/36.2 |
| 5,380,571 | A | * | 1/1995 | Ozawa et al. ............... 428/36.9 |
| 5,449,713 | A | * | 9/1995 | Nakahama ................... 524/491 |
| 5,859,114 | A | | 1/1999 | Davis et al. ................. 524/490 |
| 6,062,269 | A | * | 5/2000 | Tanaka et al. ............... 138/126 |
| 6,071,582 | A | | 6/2000 | Tangiku et al. |
| 6,114,449 | A | | 9/2000 | Tojo et al. ................... 525/105 |
| 6,166,143 | A | * | 12/2000 | Watanabe et al. ........... 525/208 |
| 6,171,671 | B1 | * | 1/2001 | Nakano et al. .......... 428/36.92 |
| 6,179,008 | B1 | * | 1/2001 | Kawazura et al. .......... 138/125 |
| 6,515,074 | B1 | * | 2/2003 | Kakarala et al. ............ 525/191 |
| 6,528,137 | B1 | * | 3/2003 | Franosch et al. .......... 428/36.9 |
| 6,656,552 | B1 | * | 12/2003 | Crouse .................... 428/36.91 |
| 6,743,862 | B1 | * | 6/2004 | Hakuta et al. ............... 525/105 |
| 2001/0018105 | A1 | * | 8/2001 | Schmitz et al. .......... 428/36.91 |
| 2002/0137847 | A1 | * | 9/2002 | Kakarala et al. ............. 525/192 |
| 2002/0152757 | A1 | | 10/2002 | Chen ............................ 62/3.7 |

FOREIGN PATENT DOCUMENTS

| JP | 10-180941 | 7/1998 |
| JP | 2004-210813 | 7/2004 |
| WO | WO98/56012 | 12/1998 |
| WO | WO02/085954 | 10/2002 |

OTHER PUBLICATIONS

European Search Report dated Jan. 14, 2005.

* cited by examiner

*Primary Examiner*—James Hook
(74) *Attorney, Agent, or Firm*—Armstrong, Kratz, Quintos, Hanson & Brooks, LLP

(57) ABSTRACT

A rubber hose material for providing a rubber hose excellent in mechanical strength and with an intrinsic property (elongation) of rubber retained. The rubber hose material is formed by blending an ethylene-olefin resin (component (B)) as an organic filler into an ethylene-propylene rubber (component (A)).

8 Claims, 1 Drawing Sheet

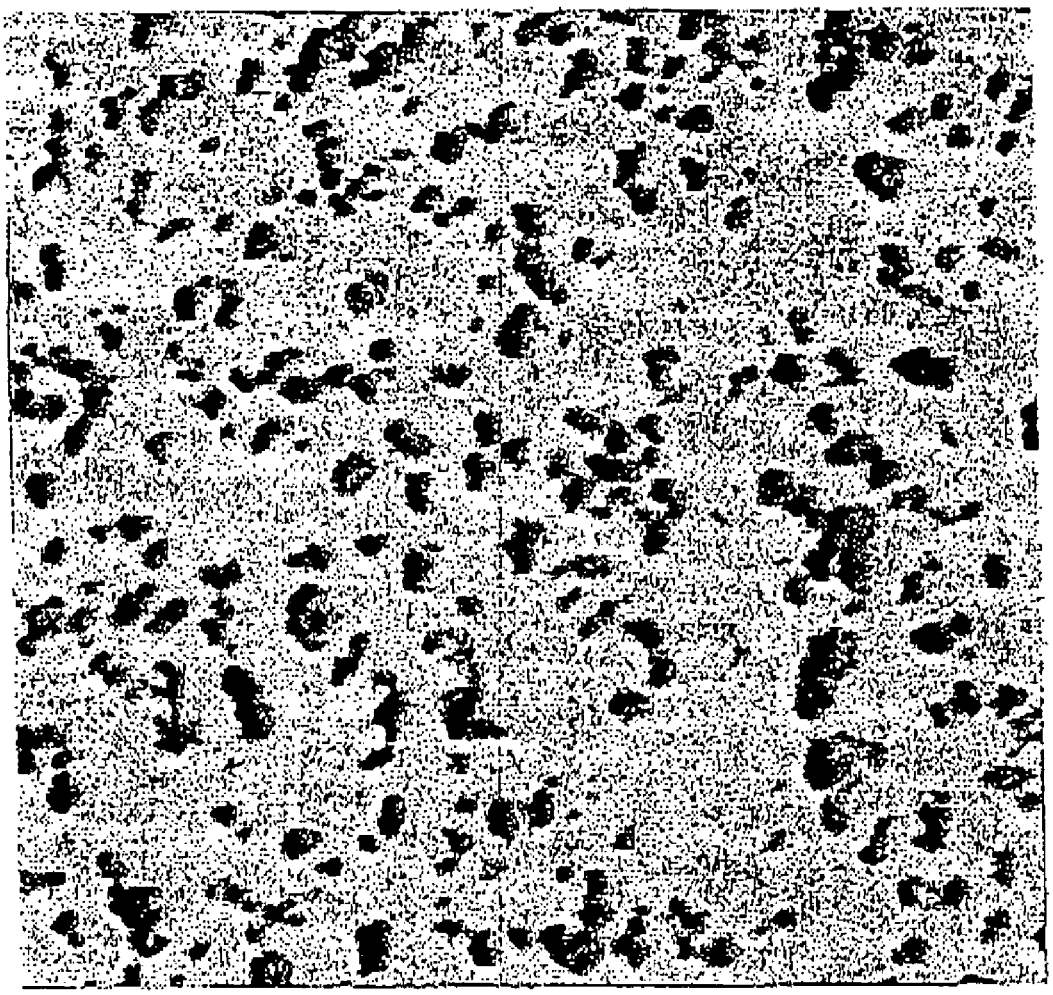
Figure

RUBBER HOSE MATERIAL AND RUBBER HOSE USING THE SAME

BACKGROUND OF THE INVENTION

1. Field of the Invention

The present invention relates to a rubber hose material and a rubber hose formed by using the same.

2. Description of the Art

Heretofore, as a rubber material for forming a rubber hose, a material where a filler (such as carbon black) and a plasticizer (such as oil) are blended into an ethylene-propylene-diene terpolymer (EPDM) has been used (see, for example, Japanese Unexamined Patent Publication No. 10-180941). However, a rubber hose formed by using such a material has low hardness and thus is inferior in mechanical strength.

There are methods for raking a rubber hose harder. For example, in method (a), the amount of carbon black to be blended into the rubber material is increased or the amount of oil to be blended into the rubber material is decreased. In method (b), crosslinking density is increased by increasing the amount of a vulcanizing agent or a crosslinking agent to be blended into the rubber material. In method (c), a resin such as polypropylene or polyethylene is blended into the rubber material.

However, since the viscosity of the unvulcanized rubber is increased in the above-mentioned method (a), processability is remarkably aggravated. Since the anti-scorching property lowers and the crosslinked rubber turns into a resin state (or an ebonite) in the above-mentioned method (b), an intrinsic property of rubber (elongation) deteriorates. Further, there is the problem that dispersibility of a resin such as polypropylene or polyethylene deteriorates in the above-mentioned method (c). Thus, the current situation is that a rubber hose material is not available where a rubber property (elongation) is retained in the resulting rubber hose and excellent mechanical strength is also imparted to the resulting rubber hose. Therefore, there has been a demand for such a rubber hose material.

In view of the foregoing, it is an object of the present invention to provide a rubber hose material which makes it possible to form a rubber hose where the rubber property (elongation) is retained and which is excellent in mechanical strength, and a rubber hose obtained by using the same rubber hose material.

SUMMARY OF THE INVENTION

In accordance with a first aspect of the present invention to achieve the object described above, there is provided a rubber hose material formed by blending an ethylene-olefin resin (component (B)) as an organic filler into an ethylene-propylene rubber (component (A)). In accordance with a second aspect of the present invention, there is provided a rubber hose formed by using the same rubber hose material.

The inventors of the present invention have conducted intensive studies centered on rubber hose materials to obtain a rubber hose where a rubber property (elongation) is retained without deterioration and which is excellent in mechanical strength. During their studies, they focused upon ethylene-olefin resins. As a result, the inventors have found that when such an ethylene-olefin resin is used as an organic filler and blended into an ethylene-propylene rubber instead of using the ethylene-olefin resin as a polymer, the ethylene-olefin resin is dispersed in the ethylene-propylene rubber as if the former is solubilized to the latter, so that a kneading property is improved therebetween. Further, they found that an ethylene-olefin resin has low crystallinity or crystallinity intermediate between an elastomer and a resin compared with normal resins (such as polyethylene resins), which means that the ethylene-olefin resin has both properties of an elastomer and a resin, so that the resulting rubber hose has an excellent mechanical property without deterioration of the rubber property (elongation).

In the inventive rubber hose material, an ethylene-olefin resin (component (B)) is blended not as a polymer, but as an organic filler, into the ethylene-propylene rubber (component (A)) so that the component (B) is dispersed in the component (A) as if the component (B) is solubilized in the component (A), resulting in improved kneadability therebetween. Further, since the ethylene-olefin resin (component (B)) has low crystallinity or crystallinity intermediate between an elastomer and a resin compared with normal resins (such as polyethylene resins), which means that the resulting rubber hose has both properties of an elastomer and a resin, the resulting rubber hose has an excellent mechanical property without deterioration of the rubber property (elongation). Further, the component (B) has a low melting point, and is easily compatible with the component (A). Still further, the component (B) can be used in a pellet form, so that the remainder of the pellet is few and processing of the thus obtained hose material is easy. Even still further, since the inventive rubber hose material has a good fluidity and has low hardness compared with inorganic fillers such as talc or clay, surface abrasion of metallic tools such as cutter or a screw can be prevented in a working process by means of a kneader or an extruder, which enables machinery to have a long life. Further, since the inventive rubber hose material does not include inorganic fillers in its compound, the rubber hose material is excellent in terms of being recycled.

When the blend ratio of the ethylene-olefin resin (component (B)) is within a specific range, electrical insulation is improved. Since the mounting rate of electrical components being mounted in vehicles such as automobiles has been increasing, stray currents easily occur. Further, since a lot of aluminum is used for realizing lighter vehicles or improving an antirust property, a local battery is easily formed due to dissimilar metal contact. Under such circumstances, if hose insulation is improved, the above-mentioned problems are solved, which leads to long-term stable performance.

Especially, when an ethylene-octene resin is used as the ethylene-olefin resin (component (B)), further excellent mechanical property can be obtained.

BRIEF DESCRIPTION OF THE DRAWING

The sole FIGURE of the drawing is a photomicrograph illustrating how ethylene-olefin resins are dispersed in a rubber hose material according to the present invention.

DESCRIPTION OF THE PREFERRED EMBODIMENTS

Embodiments of the present invention will hereinafter be described in detail.

A rubber hose material according to the present invention is formed by blending an ethylene-olefin resin (component (B)) as an organic filler into an ethylene-propylene rubber (component (A)).

Examples of the ethylene-propylene rubber (component (A)) include an ethylene-propylene-diene terpolymer (EPDM) and an ethylene-propylene copolymer (EPM), which may be used either alone or in combination.

The ethylene-propylene rubber (component (A)) is not specifically limited, however, it is preferred that the ethylene-propylene rubber has an iodine value of 6 to 30 and an ethylene content of 48 to 70% by weight. In particular, the iodine value more preferably is in the range of 10 to 24, while the ethylene content more preferably is in the range of 50 to 60% by weight. Such an ethylene-propylene rubber is excellent in stability at high temperatures and pressures.

The diene monomer (third component) for use in EPDM is not specifically limited, however, a diene monomer with 5 to 20 carbon atoms is preferred. Examples of the diene monomer include 1,4-pentadiene, 1,4-hexadiene 1,5-hexadiene, 2,5-dimethyl-1,5-hexadiene, 1,4-octadiene, 1,4-cyclohexadiene, cyclooctadiene, dicyclo-pentadiene (DCP), 5-ethylidene-2-norbornene (ENB), 5-butylidene-2-norbornene, 2-methallyl-5-norbornene, 2-isopropenyl-5-norbornene and the like. These diene monomers may be used either alone or in combination. Among these diene monomers, it is preferred that dicyclopentadiene (DCP) and 5-ethylidene-2-norbornene (ENB) are particularly preferred.

A notable feature of the present invention is that an ethylene-olefin resin (component (B)) is used as an organic filler with an ethylene-propylene rubber (component (A)). The ethylene-olefin resin (component (B)) is not specifically limited, however, examples include those resins which are obtained by copolymerizing ethylene and an α-olefin having 3 to 10 carbon atoms. Specific examples of such α-olefins include propylene, butene-1, pentene-1, hexene-1, 4-methyl-pentene-1, heptene-1, octene-1, nonene-1 and decene-1, which are used either alone or in combination. Among the above, those resins which are obtained by copolymerizing ethylene and an α-olefin having 6 to 10 carbon atoms are preferred, particularly in terms of superiority in balance between mechanical strength and a radical-crosslinking property. Particularly, an ethylene-octene resin obtained by copolymerizing ethylene and octene-1 is most preferred.

The ethylene-olefin resin (component (B)) may be produced by means of a conventional metallocene catalyst. The metallocene catalyst may comprise cyclopentadienyl derivatives of the fourth group metals of the periodic table such as titanium and zirconium, and a co-catalyst. The metallocene catalyst is especially super-high active as a polymerizing catalyst, and also has the features that the molecular weight distribution of the resulting copolymer is narrow as compared with that produced by a conventional catalyst such as a Ziegler catalyst, and that the distribution of the α-olefin having 3 to 10 carbon atoms as a co-monomer of the copolymer is uniform, and that the catalyst seeds are uniform.

The polymerizing catalyst is super-high active in the ethylene-olefin resin using the metallocene catalyst as compared with the case where the Ziegler catalyst is used, so that the composition of the α-olefin as a co-monomer is greatly increased as compared with the conventional case. Therefore, if such an ethylene-olefin resin does not include a plasticizer, a copolymer in an elastomer state having high flexibility can be obtained.

The ethylene-olefin resin (component (B)) is preferably present in a proportion of 2 to 50 parts by weight (hereinafter just abbreviated to "parts"), particularly preferably in a proportion of 10 to 30 parts, based on 100 parts of the ethylene-propylene rubber (component (A)). When the blend ratio is smaller than 2 parts, sufficient mechanical properties such as sufficient hardness cannot be obtained. When the blend ratio is greater than 50 parts, the thus obtained hose tends to have a dry scaly skin, so that hose appearance deteriorates and rolling processability tends to deteriorate.

In addition to the ethylene-propylene rubber (component (A)) and the ethylene-olefin resin (component (B)), one or more of carbon black, a vulcanizing agent, a peroxide crosslinking agent, a co-crosslinking agent, a process oil, an anti-aging agent and the like may be added to the inventive rubber hose material, as required.

The carbon black is not specifically limited, however, those which are excellent in providing extruding processability and reinforcing effects are preferred. Examples thereof include SRF (Semi Reinforcing Furnace) grade carbon black.

The carbon black is preferably present in a proportion of 20 to 140 parts, particularly preferably 60 to 120 parts, based on 100 parts of the ethylene-propylene rubber (component (A)). If the proportion of the carbon black is smaller than 20 parts, a reinforcing effect tends to be poor and high hardness of the resulting hose generally cannot be realized. If the proportion of the carbon black is greater than 140 parts, the resulting hose tends to have a low electrical resistance, resulting in deterioration of the electrical insulation.

As the vulcanizing agent, for example, sulfur may be used.

The vulcanizing agent is preferably present in a proportion of 1.5 to 15 parts based on 100 parts of the ethylene-propylene rubber (component (A)). If the proportion of the vulcanizing agent is smaller than 1.5 parts, the resulting hose tends to have low strength because of insufficient vulcanization. If the proportion of the vulcanizing agent is greater than 15 parts, the resulting hose tends to have a poor flexibility with high hardness, and the scorching time tends to be short, resulting in a deterioration of the processability.

Examples of the peroxide crosslinking agent include peroxy ketals such as 1,1-bis(t-butylperoxy)-3,3,5-trimethyl cyclohexane, 1,1-bis(t-hexylperoxy)-3,3,5-trimethyl cyclohexane, 1,1-bis(t-hexylperoxy)cyclohexane, 1,1-bis(t-butylperoxy)cyclododecane, 1,1-bis(t-butylperoxy) cyclohexane, 2,2-bis(t-butylperoxy)octane, n-butyl-4,4-bis(t-butylperoxy)butane and n-butyl-4,4-bis(t-butylperoxy) valerate; dialkyl peroxides such as di-t-butylperoxide, dicumyl peroxide, t-butyl cumylperoxide, α,α'-bis(t-butylperoxy-m-isopropyl)benzene, α,α'-bis(t-butylperoxy)diisopropylbenzene, 2,5-dimetyl-2,5-di(t-butylperoxy)hexane and 2,5-dimetyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichloro-benzoyl peroxide and m-toluoylperoxide; peroxy esters such as t-butylperoxy acetate, t-butylperoxy isobutylate, t-butylperoxy-2-ethylhexanoate, t-butylperoxylaurylate, t-butyl peroxybenzoate, di-t-butyl peroxyisophthalate, 2,5-dimethyl-2,5-di(benzoyl peroxy))hexane, t-butylperoxy maleic acid, t-butylperoxy isopropylcarbonate and cumylperoxyoctate; and hydro peroxides such as t-butylhydroperoxide, cumene hydroperoxide, diisopropylbenzene hydroperoxide, 2,5-dimethylhexane-2,5-dihydroperoxide and 1,1,3,3-tetramethylbutylperoxide, which may be used either alone or in combination. Among these peroxide crosslinking agents, 2,5-dimethyl-2,5-di(t-butylperoxy)hexane is particularly preferred, because it is free from problems associated with odor or smell.

The peroxide crosslinking agent is preferably present in a proportion of 1.5 to 20 parts based on 100 parts of the ethylene-propylene rubber (component (A)). If the proportion of the peroxide crosslinking agent is smaller than 1.5 parts, the resulting hose tends to have a low strength because of insufficient crosslinking. If the proportion of the peroxide crosslinking agent is greater than 20 parts, the resulting hose tends to have a poor flexibility with high hardness.

Preferable examples of the co-crosslinking agent include, for example, divinyl benzene and triallyl isocyanurate (TAIC). Further examples thereof include triallyl cyanurate, diacetone diiacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenyl benzene, p-quinonedioxime, p,p'-dibenzoyl quinonedioxime phenyl maleimide, allyl methacrylate, N,N-m-phenylenebismaleimide, diallyl phthalate, tetraallyl oxyethane and 1,2-polybutadiene, which may be used either alone or in combination.

The co-crosslinking agent is preferably present in a proportion of 0.1 to 10 parts, particularly preferably 0.5 to 7.0 parts, based on 100 parts of the ethylene-propylene rubber (component (A)).

Preferable examples of the process oil include, for example, aroma oil, naphthene oil and paraffin oil, which may be used either alone or in combination.

The process oil is preferably present in a proportion of 5 to 100 parts, particularly preferably 20 to 80 parts, based on 100 parts of the ethylene-propylene rubber (component (A)).

Examples of the anti-aging agent include, for example, a carbamate anti-aging agent, a phenylenediamine anti-aging agent, a phenol anti-aging agent, a diphenylamine anti-aging agent, a quinoline anti-aging agent and waxes, which may be used either alone or in combination.

The anti-aging agent is preferably present in a proportion of 0.2 to 2.0 parts, particularly preferably 0.5 to 1.0 parts, based on 100 parts of the ethylene-propylene rubber (component (A)).

The inventive hose rubber material can be prepared by blending the ethylene-olefin resin (component (B)) as an organic filler into the ethylene-propylene rubber (component (A)), and blending any of carbon black, a crosslinking agent, a process oil, an anti-aging agent or the like therein as required, and then kneading the resulting blend by means of a kneading machine such as a kneader, a Banbury mixer or a roll mill.

The sole FIGURE of the drawing is a photomicrograph illustrating how ethylene-olefin resins (component (B)) are dispersed in a rubber hose material according to the present invention. In the FIGURE, the white portion denotes the ethylene-propylene rubber (component (A)), the black portion denotes carbon black, and the portion of a color between white and black denotes the ethylene-olefin resin (component (B)). The harder portion appears as deeper black color in the FIGURE. Thus, the ethylene-olefin resin (component (B)) is dispersed in the inventive rubber hose material as an organic filler as if the interface of the component (B) is compatibilized to the component (A). Therefore, the mechanical properties of the component (A) are not deteriorated and the kneadability between the components (A) and (B) is excellent. The FIGURE is a photomicrograph observed by a scanning probe microscope (SPM available from Shimadzu Corporation of Kyoto, Japan, size: 5 µm×5 µm).

The inventive rubber hose is produced, for example, by molding the inventive rubber house material, as prepared in the above-mentioned manner, and vulcanizing the resulting mold under prescribed conditions, and forming the resulting mold into a hose shape. Further, the inventive rubber hose may be produced by means of a mandrel. In this embodiment, the rubber hose material is extruded on the mandrel, is vulcanized at specified conditions, and then the mandrel is withdrawn.

The thus produced hose may generally have a thickness of 1.5 to 12 mm and an internal diameter of 5 to 50 mm.

The structure of the hose is not limited to the aforesaid single-layer structure and the hose may have a multi-layer structure of two or more layers. In this case, an innermost layer of the hose is preferably formed by using the inventive hose material from the viewpoint of electrical insulation.

The inventive rubber hose material is preferably used as a material for forming hoses used in automobiles such as engine-cooling-system hoses, for example, a radiator hose for connecting an engine and a radiator or a heater hose for connecting an engine and a heater core in vehicles such as an automobile, a transportation hose of coolant for a cooler or an air hose. Further, the inventive rubber hose material may be used as a weather-strip, a gasket, a protector or the like. However, the inventive rubber hose material excludes a hose material used for a fuel-cell car, such as a hose for transporting water-based fuel of a fuel cell, and the inventive rubber hose similarly excludes a hose used for a fuel-cell car, such as a hose for transporting water-based fuel of a fuel cell.

Next, an explanation will be given to Examples of the present invention and Comparative Examples.

Prior to the explanation of Examples and Comparative Examples, materials herein employed will be explained.

EPDM

ESPRENE 501A available from Sumitomo Chemical Co., Ltd., of Tokyo, Japan

EPM

ESPRENE 201 available from Sumitomo Chemical Co., Ltd., of Tokyo, Japan

Ethylene-octene Resin

A copolymer of ethylene and octene-1 (EXACT 0230 available from DEX PLASTOMERS of Heerlen, Netherlands)

Carbon Black

SRF grade carbon black (Showblack IP-200 available from Showa Cabot K.K. of Tokyo, Japan)

Process Oil

Diana Process PW-380 available from Idemitsu Kosan Co., Ltd. of Tokyo, Japan

Peroxide Crosslinking Agent 2,5-dimethyl-2,5-di(t-butylperoxy) hexane (PERHEXA 25B available from NOF Corporation of Tokyo, Japan)

Co-crosslinking Agent

Ethylene glycol-dimethacrylate (Hi-cross ED available from Seiko Chemical Co., Ltd. of Tokyo, Japan)

Phenylamine Anti-aging Agent 2,2,4-trimethyl-1,2'-dihydroquinoline (TMDQ) (NONFLEX RD) available from Seiko Chemical Co., Ltd. of Tokyo, Japan)

Silica

NIPSIL ER available from TOSOH SILICA CORPORATION of Tokyo, Japan

Polypropylene Resin

MIRASON 50 available from Sumitomo Mitsui Polyolefin Company, Ltd. of Tokyo, Japan Vulcanizing Accelerator
Sanceler TTG available from Sanshin Chemical Industry Co., Ltd. of Yamaguchi, Japan Vulcanizing Accelerator
Sanceler TET-G available from Sanshin Chemical Industry Co., Ltd. of Yamaguchi, Japan Vulcanizing Accelerator
Sanceler CM available from Sanshin Chemical Industry Co., Ltd. of Yamaguchi, Japan Vulcanizing Accelerator
Sanceler DM available from Sanshin Chemical Industry Co., Ltd. of Yamaguchi, Japan Vulcanizing Agent (Sulfur)
Sulfur PTC available from Sanshin Chemical Industry Co., Ltd. of Yamaguchi, Japan Examples 1 to 6, Comparative Examples 1 to 5

Each material was blended as shown in the following Tables 1 and 2, and then the resulting blend was kneaded by means of a Banbury mixer and a roll mill for preparation of a rubber hose material.

Properties of the rubber hose materials thus produced in accordance with the Examples and the Comparative Examples were evaluated in the following manners. The results of the evaluations are also shown in the following Tables 1 and 2.

Scorch Time

Viscosity of each rubber hose material was measured by means of Mooney plastometer. Then, time (minutes) required to increase 5 units from the initial viscosity in terms of Mooney unit was measured for determination of a scorch time. The specific operation was conducted in conformity with Mooney Scorching Test (test temperature: 121° C.) described in Japanese Industrial Standards (hereinafter just abbreviated to JIS) K 6300.

Molded Surface Evaluation (Garvey Die)

Surface of the molded product obtained by using each rubber hose material by means of Garvey die was visually evaluated on a scale of A to E in conformity with ASTM D 2230, in which smoothness was decreased in this order. The symbol ○ indicates that the surface was evaluated as "A" and the symbol × indicates that the surface was evaluated as "B" or below.

Elongation (EB)

Each hose material was press-vulcanized at 160° C. for 45 minutes for preparation of a vulcanized rubber sheet having a thickness of 2 mm, and then stamped to provide a JIS No. 5 dumbbell specimen. The elongation (EB) of the specimen was determined in conformity with JIS K 6251.

Hardness (HA)

The hardness of the thus obtained vulcanized rubber sheet was measured by means of a durometer of type A in conformity with JIS K 6253.

Volume Resistivity

The volume resistivity was determined in conformity with JIS K 6911 by using each hose material.

TABLE 1

| | (Parts by weight) EXAMPLE | | | | | |
|---|---|---|---|---|---|---|
| | 1 | 2 | 3 | 4 | 5 | 6 |
| EPDM | 100 | 100 | 100 | 100 | 100 | — |
| EPM | — | — | — | — | — | 100 |
| Ethylene-octene rubber | 10 | 30 | 50 | 30 | 2 | 30 |
| Carbon black | 100 | 100 | 100 | 100 | 100 | 100 |
| Process oil | 50 | 50 | 50 | 50 | 50 | 50 |
| Peroxide crosslinking agent | 7 | 7 | 7 | — | 7 | 7 |
| Co-crosslinking agent | 3 | 3 | 3 | — | 3 | 3 |
| Anti-aging agent | 1 | 1 | 1 | 1 | 1 | 1 |
| Sanceler TTG | — | — | — | 1 | — | — |
| Sanceler TET-G | — | — | — | 1 | — | — |
| Sanceler CM | — | — | — | 1 | — | — |
| Sanceler DM | — | — | — | 1 | — | — |
| Vulcanizing agent (Sulfur) | — | — | — | 1 | — | — |
| Scorch time (min) | 10< | 10< | 10< | 10< | 10< | 10< |
| Molded surface evaluation | ○ | ○ | ○ | ○ | ○ | ○ |
| Elongation (%) | 280 | 300 | 350 | 500 | 260 | 350 |
| Hardness (HA) | 70 | 75 | 82 | 75 | 63 | 75 |
| Volume resistivity ($\Omega \cdot cm$) | $1.0 \times 10^7$ | $1.0 \times 10^8$ | $1.0 \times 10^9$ | $1.0 \times 10^8$ | $5.0 \times 10^6$ | $1.0 \times 10^8$ |

TABLE 2

| | (Parts by weight) COMPARATIVE EXAMPLE | | | | |
|---|---|---|---|---|---|
| | 1 | 2 | 3 | 4 | 5 |
| EPDM | 100 | 100 | 100 | 100 | 100 |
| EPM | — | — | — | — | — |
| Ethylene-octene rubber | — | — | — | — | — |
| Polypropylene resin | — | — | — | — | 30 |
| Carbon black | 100 | 150 | 100 | 100 | 100 |
| Process oil | 50 | 50 | 20 | 50 | 50 |

TABLE 2-continued

| | (Parts by weight) COMPARATIVE EXAMPLE | | | | |
|---|---|---|---|---|---|
| | 1 | 2 | 3 | 4 | 5 |
| Peroxide crosslinking agent | 7 | 7 | 7 | 25 | 7 |
| Co-crosslinking agent | 3 | 3 | 3 | 3 | 3 |
| Anti-aging agent | 1 | 1 | 1 | 1 | 1 |
| Scorch time (min) | 10< | 7 | 6 | 0.5 | 10< |
| Molded surface evaluation | ○ | ○ | ○ | * | X |
| Elongation (%) | 250 | 170 | 150 | 100 | 400 |
| Hardness (HA) | 60 | 70 | 70 | 72 | 75 |
| Volume resistivity ($\Omega \cdot$ cm) | $1.0 \times 10^6$ | $1.0 \times 10^4$ | $5.0 \times 10^4$ | $1.0 \times 10^6$ | $1.0 \times 10^8$ |

*It was impossible to evaluate it due to burn mark caused in molding.

As can be understood from the results shown in the Tables, each scorch time or each material of Examples was long, and each molded surface evaluation (Garvey die) thereof was good, and each material of Examples were excellent in elongation, hardness and electrical insulation.

On the other hand, the material of Comparative Example 1, which did not include ethylene-olefin resin, had poor hardness. The material of Comparative Example 2, in which the amount of carbon black was increased compared with the material of Comparative Example 1, had high hardness, however, had a short scorch time, and was poor in elongation and electrical insulation. The material of Comparative Example 3, in which the amount of oil was decreased compared with the material of Comparative Example 1, had high hardness, however, had a short scorch time, and was poor in elongation and electrical insulation. The material of Comparative Example 4, in which the amount of a crosslinking agent was increased, had high hardness, however, turned into an ebonite state so as to lose elongation, and had a short scorch time. Further, the material of Comparative Example 5, in which polypropylene resin was included, had high hardness, but was inferior in molded surface evaluation (Garvey die) because the crystallinity of the polypropylene was high.

The inventive rubber hose material is preferably used as a material for hoses used in automobiles such as an engine-cooling-system hose, for example, a radiator hose for connecting an engine and a radiator or a heater hose for connecting an engine and a heater core in vehicle such as an automobile, a transportation hose of coolant for a cooler or an air hose.

What is claimed is:

1. A rubber hose material formed by blending an ethylene-olefin resin (component (B)) as an organic filler into an ethylene-propylene rubber (component (A)).

2. A rubber hose material as set forth in claim 1, wherein the component (B) is present at 2 to 50 parts by weight based upon 100 parts by weight of the component (A).

3. A rubber hose material as set forth in claim 2, wherein the ethylene-olefin resin (component (B)) is an ethylene-octene resin.

4. A rubber hose formed by molding a rubber hose material as set forth in claim 3 into a hose shape.

5. A rubber hose formed by molding a rubber hose material as set forth in claim 2 into a hose shape.

6. A rubber hose material as set forth in claim 1, wherein the ethylene-olefin resin (component (B)) is an ethylene-octene resin.

7. A rubber hose formed by molding a rubber hose material as set forth in claim 6 into a hose shape.

8. A rubber hose formed by molding a rubber hose material as set forth in claim 1 into a hose shape.

* * * * *